Dec. 8, 1959  W. B. WESTCOTT, JR  2,916,283
LANDING GEAR CONSTRUCTION
Filed July 18, 1955  2 Sheets-Sheet 1

INVENTOR.
WILLIAM B. WESTCOTT, Jr.
BY
ATTORNEY

Dec. 8, 1959     W. B. WESTCOTT, JR     2,916,283
LANDING GEAR CONSTRUCTION

Filed July 18, 1955     2 Sheets-Sheet 2

INVENTOR.
WILLIAM B. WESTCOTT, Jr.
BY
ATTORNEY

United States Patent Office 2,916,283
Patented Dec. 8, 1959

2,916,283

LANDING GEAR CONSTRUCTION

William B. Westcott, Jr., Cleveland Heights, Ohio, assignor to Cleveland Pneumatic Industries, Inc., Cleveland, Ohio, a corporation of Ohio Application July 18, 1955, Serial No. 522,663

7 Claims. (Cl. 267—64)

This invention relates generally to fluid springs and more particularly to a new and improved fluid spring suitable for use in aircraft landing gears.

It is an important object of this invention to provide a landing gear incorporating a fluid spring wherein a first spring rate is provided between the fully extended position and the normal static position of the gear and a second higher spring rate through the portions of the stroke between the static position and the fully compressed position.

It is another important object of this invention to provide a landing gear particularly adapted for use on aircraft wherein the take-off load is substantially greater than the landing load.

It is still another important object of this invention to provide a fluid spring wherein one area is effective during one portion of the stroke and a second larger area is effective in the remaining portions of the stroke.

It is still another object of this invention to provide a landing gear structure suitable for use on the nose gear of an aircraft to eliminate a bouncing of the aircraft when the brakes are applied during taxiing operations.

Further objects and advantages will appear from the following description and drawings, wherein.

Figure 1:
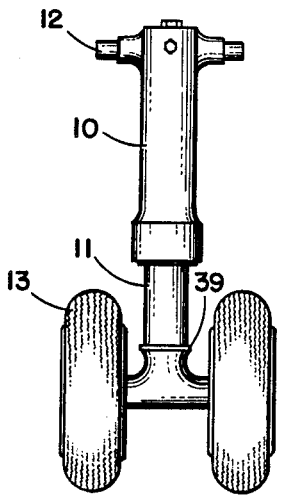
Figure 1 is a front elevation of a landing gear according to this invention.

A landing gear according to this invention provides a fluid spring wherein the spring rate between the extended and static positions provides one load stroke relationship and the spring rate between the static and compressed positions provides a higher load stroke relationship. In many of the newer jet planes extremely large amounts of fuel must be carried which are expended during the flight of the aircraft. For this reason the take-off weight of the aircraft is much greater than the landing weight. In some cases the take-off weight is in the order of one and one-half times as great as the landing weight. Because of this very large difference weights between the take-off and landing, difficulty is encountered in providing a landing gear which will provide the correct load stroke curve for both load conditions. If the landing gear is designed so that the spring rate is proper for the weight of the aircraft during landing, the static or predetermined intermediate position of the oleo mechanism when the aircraft is fully loaded prior to take-off is too close to the fully compressed position. Conversely, if the fluid spring mechanism of the oleo is designed so that a proper static position will be provided for the fully loaded aircraft, the static position in landing will be too close to the fully extended position. In a landing gear according to this invention, the fluid under pressure is effective on one area in all positions between the fully extended position and the static position and effective on a larger area in all positions between the static position and the fully compressed position. The various elements are proportioned so that the empty aircraft will cause the oleo mechanism to assume a proper static position and this static position will also be maintained for the heavily loaded aircraft.

The preferred oleo mechanism is also applicable for use in a nose strut of tricycle landing gears to eliminate the bouncing that occurs during taxiing when the brakes are applied. In a conventional nose strut the application of the brakes during taxiing causes a shift of the mass loading to the nose strut which compresses the strut and sets up a bouncing in the aircraft. If an oleo mechanism, according to this invention, is utilized for the nose strut of a landing gear, bouncing will not occur when the brakes are applied because the oleo mechanism will maintain the desired static position through relatively large variations in loading.

Reference should now be made to the drawings wherein the preferred structure is shown. The strut provides an upper telescoping member 10 and a lower telescoping member 11 which are capable of relative axial motion. The upper telescoping member 10 is adapted to be mounted on an aircraft by means of a mounting trunnion 12 and a ground engaging wheel 13 is journaled at the lower end of the lower telescoping member 11. The lower end of the upper member 10 is formed with an enlarged counter bore 15 in which a gland member 14 is slidably mounted for limited axial motion between a shoulder 16 and a lock nut 17. A first resilient seal 18 prevents fluid leakage between the gland member 14 and the upper telescoping member 10 and a second resilient seal 19 prevents fluid leakage between the gland member 14 and the lower telescoping member 11.

A plunger tube 22 mounted on the upper telescoping member 10 is formed with a flanged portion 23 which engages the inner wall of the lower telescoping member 11 and provides a shoulder 24 against which an orifice plate 26 is secured by a snap ring 27. A bulkhead 21 in the lower telescoping member 11, the lower telescoping member 11 and the orifice plate 26 cooperate to define a variable volume liquid filled chamber 28. Above the orifice plate 26 within the upper telescoping member 10 is a substantially constant volume chamber 29 which includes the area within the plunger tube 22 and the area between the plunger tube 22 and the upper telescoping member 10. The plunger tube 22 is formed with ports 31 which provide a flow connection between these two areas.

A metering pin 32 is mounted on the bulkhead 21 and projects through an orifice 33 formed in the orifice plate 26 and regulates the flow of fluid through the orifice when the upper and lower telescoping members 10 and 11 move axially relative to each other. When properly charged, the variable volume chamber 28 is completely filled with liquid as is the lower portion of the constant volume chamber 29. The upper portions of the constant volume chamber 29 are charged with air under pressure.

An upper bearing 34 is mounted on the lower telescoping member 11 and provides lateral supports between the upper end of the lower telescoping member 11 and upper telescoping member 10. The upper bearing 34 is preferably formed with a plurality of orifices 36 which provide a restricted flow connection between the constant volume chamber 29 and a rebound chamber 37. The lower telescoping member 11 is provided with axially spaced stops 38 and 39 which are adapted to engage the ends of the gland member 14 and limit the axial motion of the lower telescoping member 11 relative to the gland member 14.

It should be understood that in normal taxiing operations when the aircraft is on the ground the pressure of the fluid in all of the chambers 28, 29 and 37 is equalized by the flow connections through the orifices 33 and 36 and that the pressure in the chambers becomes unequal only when the telescoping members 10 and 11 are moving axially relative to each other such as during a landing impact or the like. When the pressures in all chambers are equalized the chambers operate as a single fluid cavity which provides a fluid spring and shock absorbing is not present. It is the fluid spring operation that will now be discussed and it should be kept in mind that the shock absorbing action is disregarded in this initial discussion.

Figure 4:
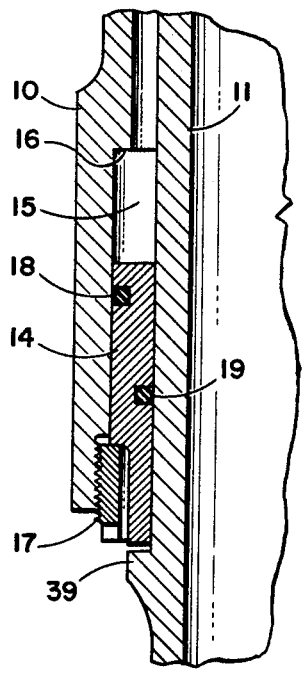
Figure 4 is an enlarged fragmentary section showing the position of the elements as they approach the static position.
Figure 5:
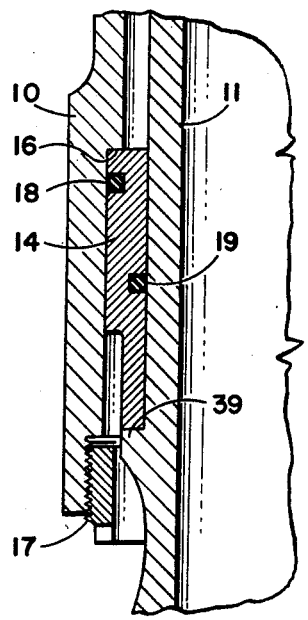
Figure 5 is a view similar to Figure 4 showing the elements in the fully compressed position; and, Figure 6 is a load stroke diagram of the landing gear.
Figure 2:
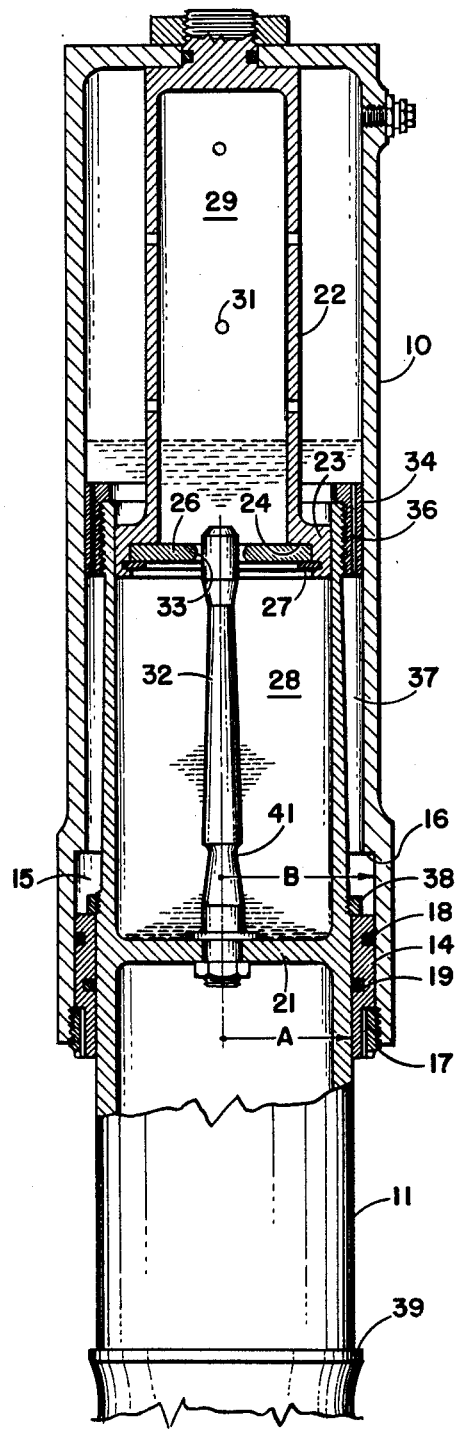
Figure 2 is an enlarged fragmentary longitudinal section showing the preferred structure according to this invention in the extended position.
Figure 3:
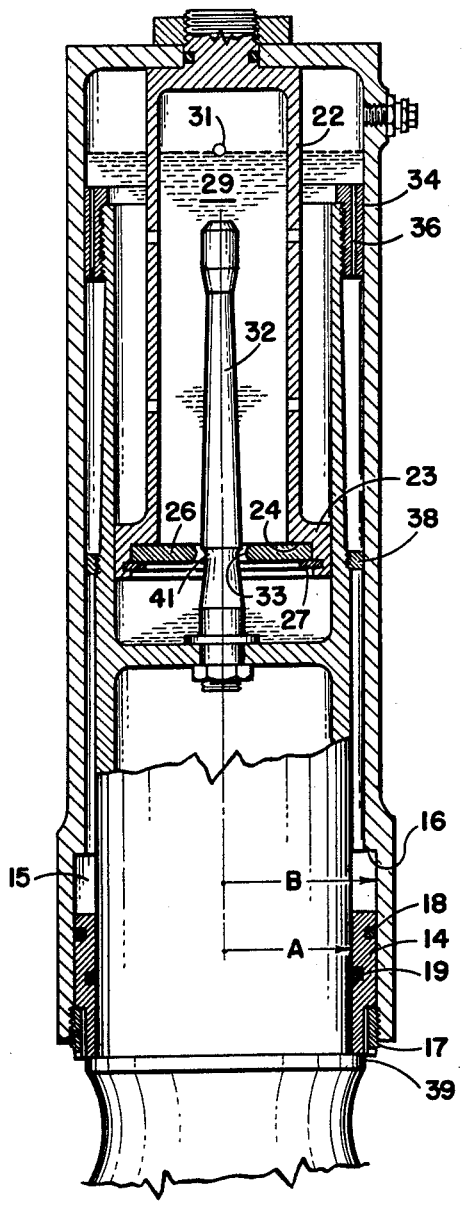
Figure 3 is a fragmentary side elevation showing the position of the elements of the landing gear in the static position.

In operation, when the various elements are in any position between the fully extended position shown in Figure 2 and the static position which is approached in Figure 4, the pressure of the fluid within the chambers 28, 29 and 37 acts on an area having a radius A to provide the resilient force urging the lower telescoping member 11 downwardly relative to the upper telescoping member 10. This reaction force, which is shown on the load stroke diagram of Figure 6 as the portion of the curve between the points E and S, is the forced reaction which is developed when the pressures within the chambers 28, 29 and 37 are equalized by the fluid connection through the orifices 33 and 36. In all positions between the fully extended and static positions, the gland member 14 is seated against the lock nut 17 by the pressure of the fluid within the rebound chamber 37. When the elements are in the fully extended position, the stop 38 is in engagement with the upper end of the gland member 14 so further extension of the lower telescoping member is impossible.

Figure 6:
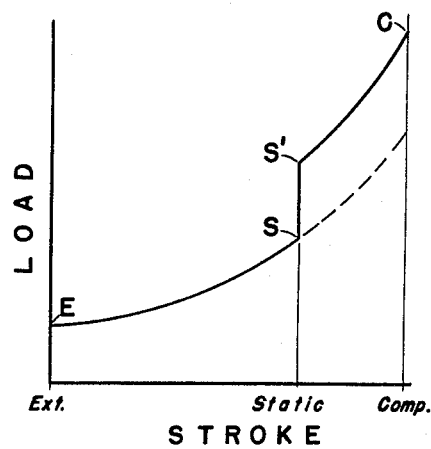

When the upper and lower telescoping members 10 and 11 move to the static position, the stop 39 engages the lower end of the gland member 14 and any further upward movement of the lower telescoping member 11 relative to the upper telescoping member 10 causes the gland member 14 to move axially upward with the lower telescoping member 11. Since the gland member 14 moves with the lower telescoping member 11 in all positions between the static position and the fully compressed position, the effective area over which the fluid within the chambers 28, 29 and 37 operates during these portions of the stroke is the area having the radius B. Since the effective area between the static position and the fully compressed position is increased by the cross sectional area of the gland member 14, the reaction force is increased sharply as soon as the gland member 14 is engaged by the stop 38 with sufficient force to transmit the reaction force to the lower telescoping member 11. The line between S and S' on the load stroke diagram of Figure 6 shows the increase of reaction on the lower telescoping member 11 at this time. Because the fluid within the chambers 28, 29 and 37 acts over the larger effective area in all positions between the static position and the fully compressed position, the reaction force follows the curve between S' and C on the load stroke diagram.

If the oleo mechanism is to be used in the landing gear of an aircraft to overcome the difficulties of heavy loadings, the pressures and proportions should be arranged so that the load carried by the strut is equal to the load of point S when the aircraft is empty and equal to the load at S' when the aircraft is fully loaded. Thus, the landing gear will be in the desired static position whenever the aircraft is stationary on the ground and sufficient stroke will remain to take care of taxiing and take-off.

During the landing impact, a substantial force reaction is produced by the build up of pressure in the chamber 28 to a value higher than the pressure within the chamber 29 due to the flow restriction through the orifice 33. Since the resistance to flow through the orifice 33 is determined by the metering pin 32 and since the total reaction to the landing impact is the sum of the shock absorbing action and the fluid spring reaction, it is possible to eliminate the effect of the increased spring rate between S and S' at the static position by contouring the metering pin with a portion of reduced cross section as at 41 so that the reaction force of the shock absorber will be reduced at the same time as the reaction force of the fluid spring is increased.

Those skilled in the art will recognize that a landing gear according to this invention provides the operational function which is desirable in aircraft wherein the landing weight is considerably less than the take-off weight and also has utility in nose strut installations. This improved function is produced by a structure which is easy to manufacture and requires little or no increase maintenance.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An aircraft landing gear comprising first and second telescoping members capable of relative axial motion between a fully extended and a fully compressed position, a gland element between said members axially movable relative thereto, said gland element and members cooperating to define a cavity filled with fluid under pressure, an orifice plate mounted on said first member dividing said cavity into first and second chambers, said orifice plate being formed with an orifice providing a flow connection between said chambers, a metering pin mounted on said second member projected into said orifice regulating the flow therethrough upon relative axial motion between said members, said fluid under pressure producing a reaction force on said gland element, stop means engageable with said gland element transmitting said reaction force to said first member when said members are in positions between said fully extended position and a predetermined intermediate position and transmitting said reaction force to said second member when said members are between said intermediate position and said fully compressed position, said metering pin being contoured to reduce the resistance to flow through said orifice when said members are in said intermediate position.

2. An aircraft landing gear comprising first and second telescoping members capable of relative axial motion between a first and a second position, a gland element between said members axially movable relative thereto, said gland element and members co-operating to define a cavity filled with fluid under pressure, an orifice plate mounted on said first member dividing said cavity into first and second chambers, said orifice plate being formed with an orifice providing a flow connection between said chambers, a metering pin mounted on said second member projected into said orifice regulating the flow therethrough upon relative axial motion between said members, said fluid under pressure producing a reaction force on said gland element, stop means on said members engageable with said gland element transmitting said reaction force to said first member when said members are in positions between said first position and a predetermined intermediate position and transmitting said reaction force to said second member when said members are between said intermediate position and said second position.

3. An aircraft landing gear comprising first and second telescoping members capable of relative axial motion between a first and a second position, a gland element between said members axially movable relative thereto preventing lateral motion between said members, said gland element and members co-operating to define a cavity filled with fluid under pressure, an orifice plate mounted on said first member dividing said cavity into first and second chambers, said orifice plate being formed with an orifice providing a restricted flow connection between said chambers, said fluid under pressure producing a reaction force on said gland element, stop means on said members engageable with said gland element transmitting said reaction force to said first member when said members are in positions between said first position and a predetermined intermediate position and transmitting said reaction force to said second member when said members are between said intermediate position and said second position.

4. An aircraft landing gear comprising first and second telescoping members capable of relative axial motion between a fully extended and a fully compressed position, a gland element between said members axially movable relative thereto preventing lateral motion between said members, said gland element and members co-operating to define a cavity filled with fluid under pressure, an orifice plate mounted on said first member dividing said cavity into first and second chambers, said orifice plate being formed with an orifice providing a flow connection between said chambers, a metering pin mounted on said second member projected into said orifice regulating the flow therethrough upon relative axial motion between said members, said fluid under pressure producing a reaction force on said gland element, stop means on said members engageable with said gland element transmitting said reaction force to said first member when said members are in positions between said fully extended position and a predetermined intermediate position and transmitting said reaction force to said second member when said members are between said intermediate position and said fully compressed position.

5. A fluid spring comprising a cylinder formed with a first bore extending from one end and a second smaller diameter bore co-axial with and extending beyond said first bore, a shoulder connecting said bores, a telescoping piston extending through said first bore and into said second bore with lateral clearances between it and the walls of said first bore, a gland slidable in said first bore providing a sliding fluid seal within the wall thereof and with said piston, a first stop element on said cylinder limiting relative axial movement between said gland and cylinder in one direction, said shoulder limiting relative axial motion in the other direction whereby said gland and cylinder are capable of relative axial motion through a limited distance, a second stop carried by said piston limiting motion thereof relative to said gland in a direction toward said cylinder, said piston and gland co-operating with said cylinder to define a cavity filled with fluid under pressure which urges both said gland and piston in a direction out of said cylinder.

6. A fluid spring comprising a cylinder formed with a first bore extending from one end and a second smaller diameter bore co-axial with and extending beyond said first bore, a telescoping piston extending through said first bore and into said second bore with lateral clearances between it and the walls of said first bore, a gland slidable in said first bore providing a sliding fluid seal within the wall thereof and with said piston, stop means on said cylinder limiting relative axial movement between said gland and cylinder in a direction away from said second bore, second stop means carried by said piston limiting motion thereof relative to said gland in a direction toward said cylinder, said piston and gland co-operating with said cylinder to define a cavity filled with fluid under pressure which urges both said gland and piston in a direction out of said cylinder, and shock absorbing means providing resistance to axial movement between said cylinder and piston.

7. A fluid spring comprising a cylinder formed with a first bore extending from one end and a second smaller diameter bore co-axial with and extending beyond said first diameter bore, a shoulder connecting said bores, a telescoping piston extending through said first bore and into said second bore with lateral clearances between it and the walls of said first bore a gland slidable in said first bore providing a sliding fluid seal within the wall thereof and with said piston, a first stop element on said cylinder limiting relative axial movement between said gland and cylinder in one direction, said shoulder limiting relative axial motion in the other direction whereby said gland and cylinder are capable of relative axial motion through a limited distance, a second stop carried by said piston limiting motion thereof relative to said gland in a direction toward said cylinder, a bearing carried by said piston at its inner end engaging said second diameter bore co-operating with said gland to prevent lateral motion between said piston and cylinder, said piston and gland co-operating with said cylinder to define a cavity filled with fluid under pressure which urges both said gland and piston in a direction out of said cylinder, and shock absorbing means providing resistance to only axial movement between said cylinder and piston.

References Cited in the file of this patent

UNITED STATES PATENTS

| | | |
|---|---|---|
| 1,474,222 | Akers et al. | Nov. 13, 1923 |
| 1,780,659 | Wallace | Nov. 4, 1930 |
| 2,139,178 | Stevens | Dec. 8, 1938 |
| 2,197,474 | Johnson | Apr. 16, 1940 |
| 2,224,676 | Griepenstroh | Dec. 10, 1940 |